(12) United States Patent
Lee et al.

(10) Patent No.: US 11,383,385 B2
(45) Date of Patent: Jul. 12, 2022

(54) MOBILE ROBOT AND METHOD FOR OPERATING THE SAME

(71) Applicant: LG ELECTRONICS INC., Seoul (KR)

(72) Inventors: Sang Hak Lee, Gyeonggi-do (KR); Nak Yeong Kim, Seoul (KR); Sung Jin Kim, Seoul (KR); Sungmin Moon, Seoul (KR); Da Eun Kim, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 187 days.

(21) Appl. No.: 16/852,801

(22) Filed: Apr. 20, 2020

(65) Prior Publication Data
US 2021/0187749 A1 Jun. 24, 2021

(30) Foreign Application Priority Data

Dec. 20, 2019 (KR) .......................... 10-2019-0172250

(51) Int. Cl.
| | |
|---|---|
| *B25J 9/16* | (2006.01) |
| *B25J 9/00* | (2006.01) |
| *B25J 5/00* | (2006.01) |
| *B25J 9/12* | (2006.01) |
| *B25J 19/04* | (2006.01) |
| *B25J 13/08* | (2006.01) |

(52) U.S. Cl.
CPC ............. *B25J 9/1697* (2013.01); *B25J 5/007* (2013.01); *B25J 9/0009* (2013.01); *B25J 9/123* (2013.01); *B25J 9/161* (2013.01); *B25J 9/1638* (2013.01); *B25J 13/085* (2013.01); *B25J 19/04* (2013.01); *B25J 9/1679* (2013.01)

(58) Field of Classification Search
CPC . B25J 5/007; B25J 9/0009; B25J 9/123; B25J 9/161; B25J 9/1615; B25J 9/1638; B25J 9/1679; B25J 9/1697; B25J 11/008; B25J 13/085; B25J 19/0008; B25J 19/023; B25J 19/04; B66F 9/063; B66F 17/003; G05B 19/41895; G05B 2219/31002; G05B 2219/31006; G05B 2219/50393; Y10S 901/01

See application file for complete search history.

(56) References Cited

U.S. PATENT DOCUMENTS

| | | | |
|---|---|---|---|
| 2007/0192910 A1* | 8/2007 | Vu ........................... | B25J 19/06 |
| | | | 700/245 |
| 2019/0329978 A1* | 10/2019 | Li ........................... | B66F 9/063 |
| 2021/0114853 A1* | 4/2021 | Nishimura ........... | B65G 1/1378 |

FOREIGN PATENT DOCUMENTS

| | | | | |
|---|---|---|---|---|
| KR | 10-2018-0123298 | 11/2018 | | |
| WO | WO-2020135460 A1 * | 7/2020 | ............... | B65G 1/04 |

\* cited by examiner

*Primary Examiner* — Dale Moyer
(74) *Attorney, Agent, or Firm* — KED & Associates, LLP

(57) ABSTRACT

Disclosed is a mobile robot capable of communicating with other electronic devices and an external server in a 5G communication environment by executing mounted artificial intelligence (AI) algorithms and/or machine learning algorithms. The mobile robot may include a wheel driver and a controller. By providing the mobile robot, an autonomous driving-based transportation service may be provided.

19 Claims, 16 Drawing Sheets

MOBILE ROBOT AND METHOD FOR OPERATING THE SAME

CROSS-REFERENCE TO RELATED APPLICATION

Pursuant to 35 U.S.C. § 119(a), this application claims the benefit of an earlier filing date of and the right of priority to Korean Application No. 10-2019-0172250, filed in Korea on Dec. 20, 2019, the contents of which are incorporated by reference herein in their entirety.

BACKGROUND

1. Technical Field

The present disclosure relates to a mobile robot that transports an article and a method for operating the mobile robot.

2. Description of Related Art

A robot may refer to a machine which automatically handles a given task on its own accord, or which operates autonomously. In particular, a robot which recognizes an environment and autonomously determines to execute an operation may be referred to as an intelligent robot, and various services may be provided by using the intelligent robot.

When a courier transports a delivery article to a predetermined place, a delivery robot according to the related art may transport the delivery article to a delivery destination such as a building, an apartment, and a shopping mall.

The delivery robot according to the related art simply transports an article to a specific place, however, there is a limitation in that load-based driving or unloading of the article cannot be performed effectively.

Further, the delivery robot according to the related art is focused on loading many articles, and thus is configured to have a wide space for loading the articles. For this reason, it is difficult to use the delivery robot in a room with many narrow paths.

Further, when an article recipient receives an article, a configuration of the delivery robot according to the related art is insufficient in terms of the convenience of the article recipient.

In addition, the delivery robot according to the related art does not have a configuration for performing interaction with a user, and thus is limited in that the delivery robot fails to effectively meet the needs of the user.

SUMMARY OF THE INVENTION

One aspect of the present disclosure is to provide a mobile robot that stores articles in a plurality of storage boxes and transports the articles to a destination, and a method for operating the mobile robot.

Another aspect of the present disclosure is to provide a mobile robot that determines center-of-gravity information based on sensing information, and a method for operating the mobile robot.

Still another aspect of the present disclosure is to provide a mobile robot that autonomously adjusts center-of-gravity when loading or unloading an article based on determined center-of-gravity information, and a method for operating the mobile robot.

Still another aspect of the present disclosure is to provide a mobile robot that effectively stores and transports an article even in a room with many small spaces.

Still another aspect of the present disclosure is to provide a mobile robot that forms an article storage space in a stacked form to effectively occupy space in a narrow space.

Still another aspect of the present disclosure is to provide a mobile robot that has a cylindrical structure capable of loading and unloading an article in a front-rear or left-right direction for user convenience and efficiency of space occupancy.

Still another aspect of the present disclosure is to provide a mobile robot that performs a user-friendly interaction.

The present disclosure is not limited to what has been described above, and other aspects not mentioned herein will be apparent from the following description to one of ordinary skill in the art to which the present disclosure pertains.

A mobile robot according to an embodiment of the present disclosure may include a body, a wheel driver configured to move the body by using a plurality of wheels, and a controller.

The body may include a plurality of storage boxes, a frame configured to fix the plurality of storage boxes such that the plurality of storage boxes form a layer in a vertical direction, and a linear driver configured to slidingly move each of the plurality of storage boxes in a front or rear direction.

The controller may monitor center-of-gravity information of the mobile robot, and based on the center-of-gravity information being beyond a reference range, the controller may slidingly move at least some of the plurality of storage boxes through the linear driver such that the center-of-gravity information is set to be within the reference range.

A method for operating a mobile robot according to another embodiment of the present disclosure may include storing an article in at least some of a plurality of storage boxes, monitoring center-of-gravity information based on pressure information of pressure applied to a plurality of wheels for moving the mobile robot and pressure distribution information of the plurality of storage boxes, and in response to the center-of-gravity information being beyond a reference range, slidingly moving at least some of the plurality of storage boxes such that the center-of-gravity information is set to be within the reference range.

A mobile robot according to still another embodiment of the present disclosure may include a plurality of storage boxes configured to store an article, a drive housing disposed below the plurality of storage boxes and in which a module for driving the mobile robot is positioned, a plurality of vertical supports extending in a height direction from an upper portion of the driving housing, disposed to face each other with the plurality of storage boxes interposed therebetween, and including a plurality of guides for slidingly moving the plurality of storage boxes, a horizontal support configured to connect the plurality of vertical supports in a horizontal direction, a head positioned on an upper portion of the horizontal support, a first sensor disposed in a predetermined region of the horizontal support and configured to monitor a front side of the mobile robot, and a second sensor disposed in the driving housing and configured to sense an external object.

A mobile robot according to various embodiments of the present disclosure may be provided, thereby loading or unloading an article in consideration of user convenience, and stably maintaining a weight balance of the mobile robot.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
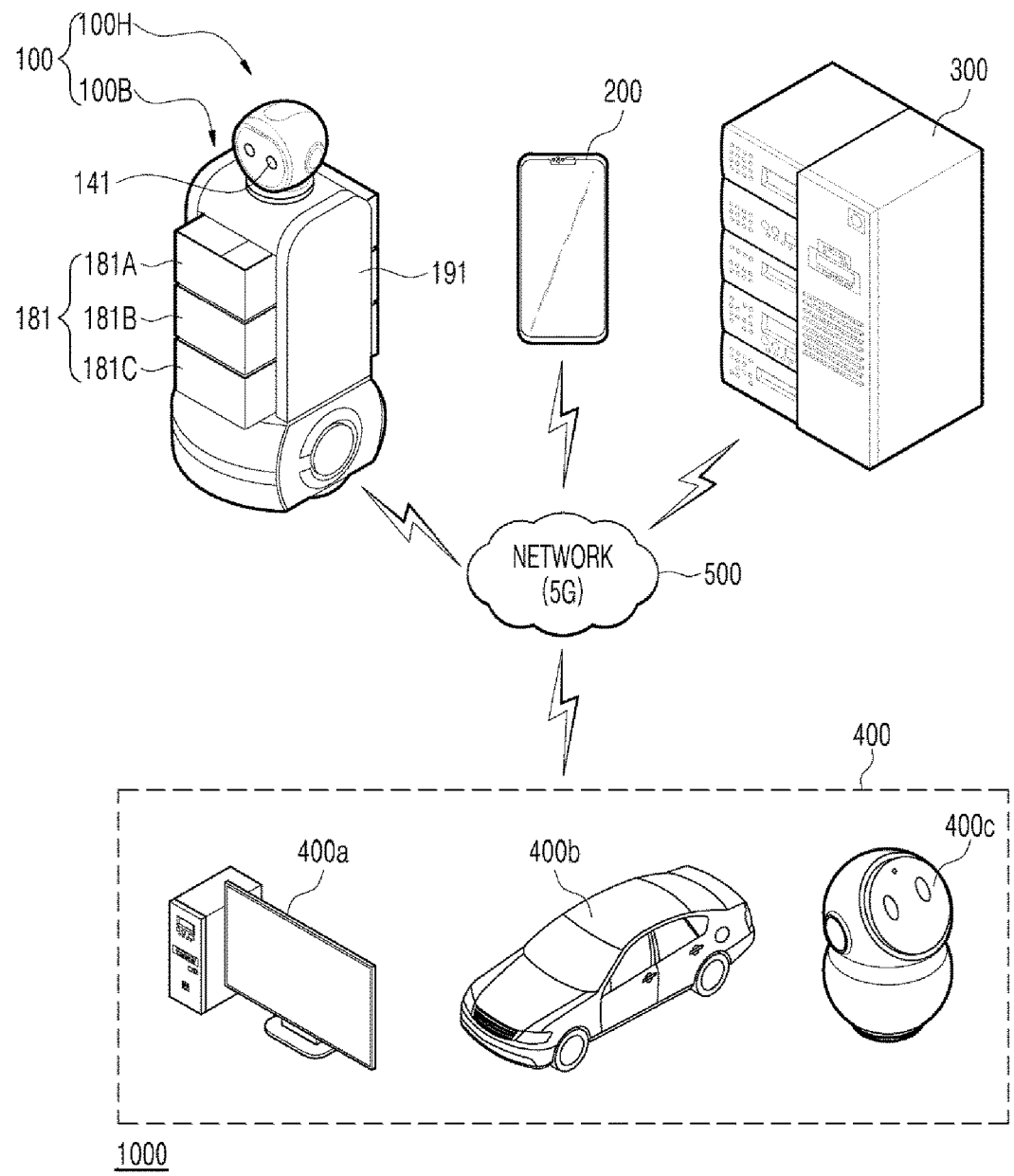
FIG. 1 illustrates a 5G network-based cloud system according to an embodiment of the present disclosure.

As used herein, the terms "module" and "unit" used to refer to components are used interchangeably in consideration of convenience of explanation, and thus, the terms per se should not be considered as having different meanings or functions. In relation to describing the present disclosure, when the detailed description of the relevant known technology is determined to unnecessarily obscure the gist of the present disclosure, the detailed description may be omitted. Further, the accompanying drawings are provided for more understanding of the embodiment disclosed in the present specification, but the technical spirit disclosed in the present invention is not limited by the accompanying drawings. It should be understood that all changes, equivalents, and alternatives included in the spirit and the technical scope of the present invention are included.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the articles "a," "an," and "the," include plural referents unless the context clearly dictates otherwise. It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

First, since various embodiments of the present disclosure use a technology related to an artificial intelligence, the artificial intelligence will be described in brief below.

Artificial intelligence (AI) refers to a field of studying AI or a methodology for creating the same. Moreover, machine learning refers to a field of defining various problems dealing in an AI field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer may include one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an ANN.

Machine learning may be classified into supervised learning, unsupervised learning, and reinforcement learning depending on the learning method.

Supervised learning may refer to a method for training an ANN with training data that has been given a label. In addition, the label may refer to a target answer (or a result value) to be guessed by the ANN when the training data is inputted to the ANN. Unsupervised learning may refer to a method for training an ANN using training data that has not been given a label. Reinforcement learning may refer to a learning method for training an agent defined within an environment to select an action or an action order for maximizing cumulative rewards in each state.

Machine learning of an ANN implemented as a deep neural network (DNN) including a plurality of hidden layers may be referred to as deep learning, and the deep learning may be one machine learning technique. Hereinafter, the meaning of machine learning may include deep learning.

FIG. 1 illustrates a 5G network-based cloud system 1000 according to one embodiment of the present disclosure.

Referring to FIG. 1, the cloud system 1000 may include a mobile robot 100, a mobile terminal 200, a control system 300, various devices 400, and a 5G network 500.

The mobile robot 100, which is a robot capable of travelling, may travel via a plurality of wheels. The mobile robot 100 may be implemented as an automated guided vehicle (AGV), and the AGV may be a transport device that is moved by, for example, a sensor, a magnetic field, or a non-electrical device on the bottom surface. In an alternative embodiment, the mobile robot 100 may travel by using a plurality of legs instead of the plurality of wheels.

The mobile robot 100, which transports articles from a starting place to a destination, may travel not only outdoors but also indoors, and may travel in a narrow passage. In an alternative embodiment, the mobile robot 100 may vertically form a layer with respect to a storage box for storing the articles, thereby simultaneously transporting the articles.

The mobile robot 100 may transmit and receive data to and from a server and various communicable terminals through the 5G network 500. In particular, the mobile robot 100 may perform data communications with the server and the terminal by using at least one network service among enhanced mobile broadband (eMBB), ultra-reliable and low latency communications (URLLC), and massive machine-type communications (mMTC) through the 5G network 500.

The enhanced mobile broadband (eMBB) which is a mobile broadband service provides multimedia contents, wireless data access, and the like. In addition, more improved mobile services such as a hotspot and a wideband coverage for receiving mobile traffic that are tremendously increasing may be provided through eMBB. Through a hotspot, high-volume traffic may be accommodated in an area where user mobility is low and user density is high. A wide and stable wireless environment and user mobility can be secured by a wideband coverage.

The URLLC service defines requirements that are far more stringent than existing LTE in terms of reliability and transmission delay of data transmission and reception, and corresponds to a 5G service for production process automation in fields such as industrial fields, telemedicine, remote surgery, transportation, safety, and the like.

mMTC (massive machine-type communications) is a service that is not sensitive to transmission delay requiring a relatively small amount of data transmission. mMTC enables a much larger number of terminals, such as sensors, than general mobile cellular phones to be simultaneously connected to a wireless access network. In this case, the price of the communication module of a terminal should be low and a technology improved to increase power efficiency and save power is required to enable operation for several years without replacing or recharging a battery.

Briefly referring to a structure of the mobile robot 100, the mobile robot 100 may include a head 100H and a body 100B. In an alternative embodiment, the mobile robot 100 may be implemented only with the body 100B and not the head 100H.

The head 100H may include a display 141 and may output various information through the display 141. For example, the display 141 may provide a user interface for performing various interactions with a user, and may provide various guide information to the user. In an alternative embodiment, the head 100H may be simply implemented as a display device.

The body 100B may include a plurality of storage boxes 181 (181A to 181C), and the body 100B may store various articles in the plurality of storage boxes 181 (181A to 181C).

The mobile terminal 200 may communicate with the mobile robot 100 through the 5G network 500, and the mobile terminal 200 may be a device possessed by a person being authorized to receive an article at a destination, or a device possessed by an article client. Here, the mobile terminal 200 may be implemented as a portable phone, a smartphone, or a wearable device such as a smartwatch, smart glasses, and a head mounted display (HMD).

The control system 300 may remotely control the mobile robot 100, and may respond to various requests of the mobile robot 100. The control system 300 may provide a moving route to the mobile robot 100 and provide a non-congested route to the mobile robot 100 in real time. The control system 300 may also perform complex AI computations and provide a result thereof to the mobile robot 100.

The various devices 400 may include, for example, a personal computer (PC) 400a, an autonomous vehicle 400b, and a home robot 400c. The home robot 400c may communicate and interact with the mobile robot 100. For example, when the mobile robot 100 accesses a home within a predetermined range, the home robot 400c may receive articles by communicating with the mobile robot 100.

The various devices 400 may be connected to, for example, the mobile robot 100, the mobile terminal 200, and the control system 300 in a wired or wireless manner via the 5G network 500.

The 5G network 500 may include, for example, a 5G mobile communication network, a local area network, and the Internet, and provide a communication environment to devices in a wired or wireless manner.

Figure 2:
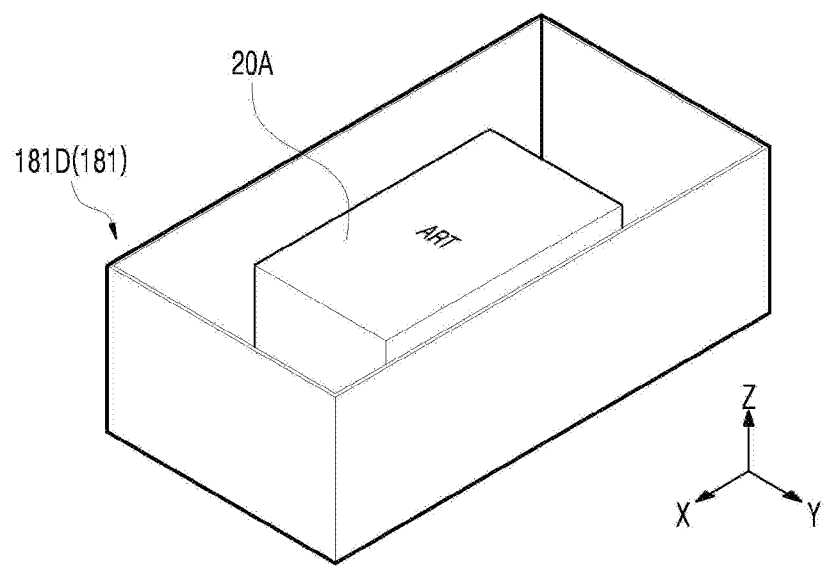
FIGS. 2 and 3 each illustrate a storage box according to various embodiments of the present disclosure.
Figure 3:
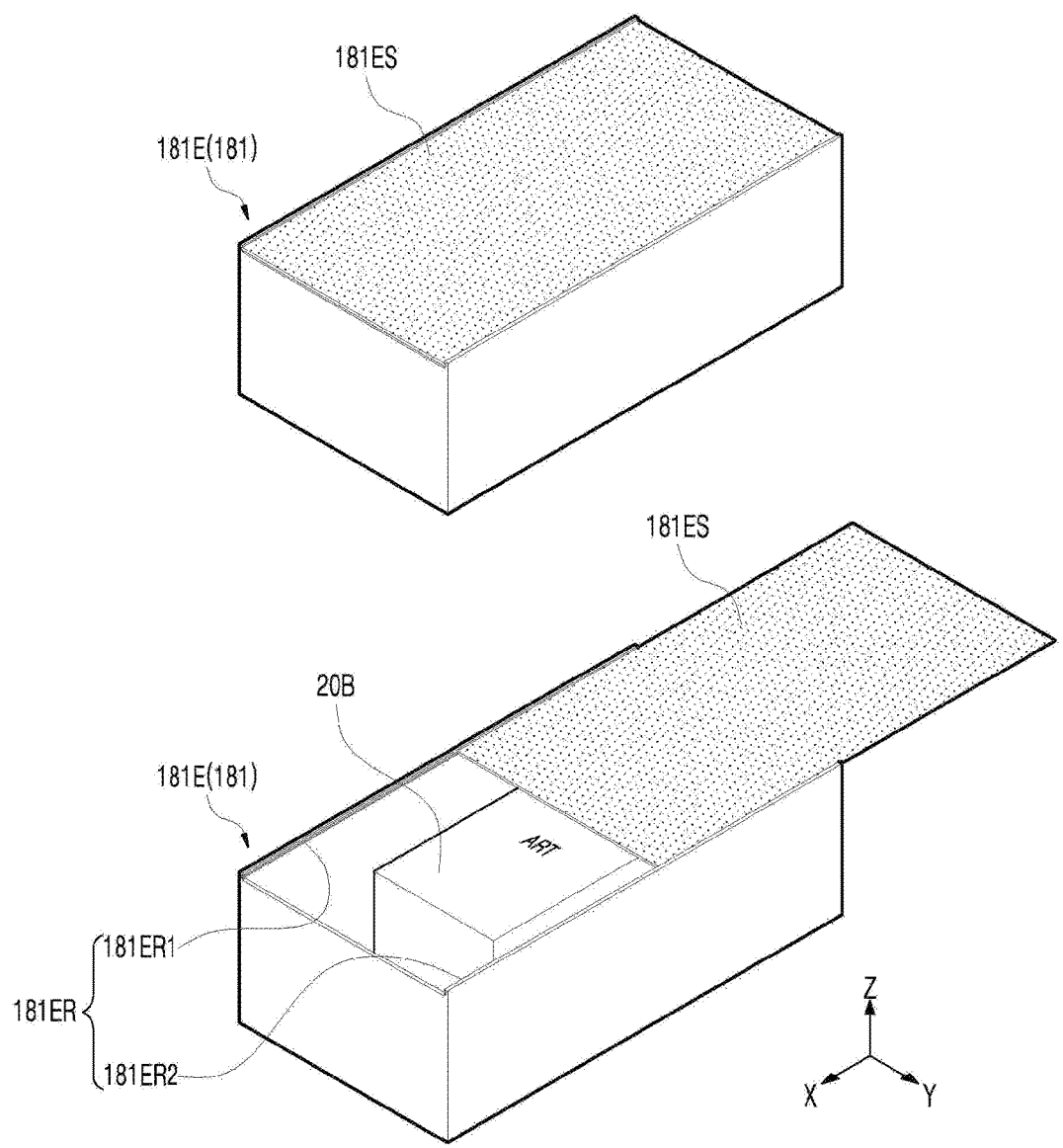

FIGS. 2 and 3 respectively illustrate a storage box 181D (181) and a storage box 181E (181) according to various embodiments of the present disclosure. The storage box 181D (181) of FIG. 2 may be a drawer-type storage box with an open upper portion, and the storage box 181E (181) of FIG. 3 may include a cover 181ES, a groove 181ER (or a rail) through which the cover 181ES moves, and a cover driver (not illustrated) for slidingly moving the cover 181ES from the groove 181ER.

Referring to FIG. 2, the storage box 181D (181) may be implemented as a drawer-type storage box with an open upper portion, and may store an article 20A. A lower portion of the storage box 181D (181) may be provided with a pressure sensor to measure pressure distribution information of pressure applied to the lower portion of the storage box 181D (181). That is, the pressure sensor may include a sensing module for measuring not only a load applied to the lower portion of the storage box 181D (181) but also a distribution of the load.

Referring to FIG. 3, the storage box 181E (181) may be implemented as a closed-type storage box of which the interior is not exposed. However, the cover 181ES of the storage box 181E (181) may slidingly move to expose the interior. In an alternative embodiment, the cover 181ES may be opened in a manner other than a sliding movement manner.

The storage box 181E (181) may include the cover 181ES, grooves 181ER1 and 181ER2 (181ER) through which the cover 181ES moves, and a cover driver (not illustrated) for slidingly moving the cover 181ES from the groove 181ER.

A lower portion of the storage box 181E (181) may be provided with a pressure sensor to measure weight distribution information of an article 20B.

Figure 4:
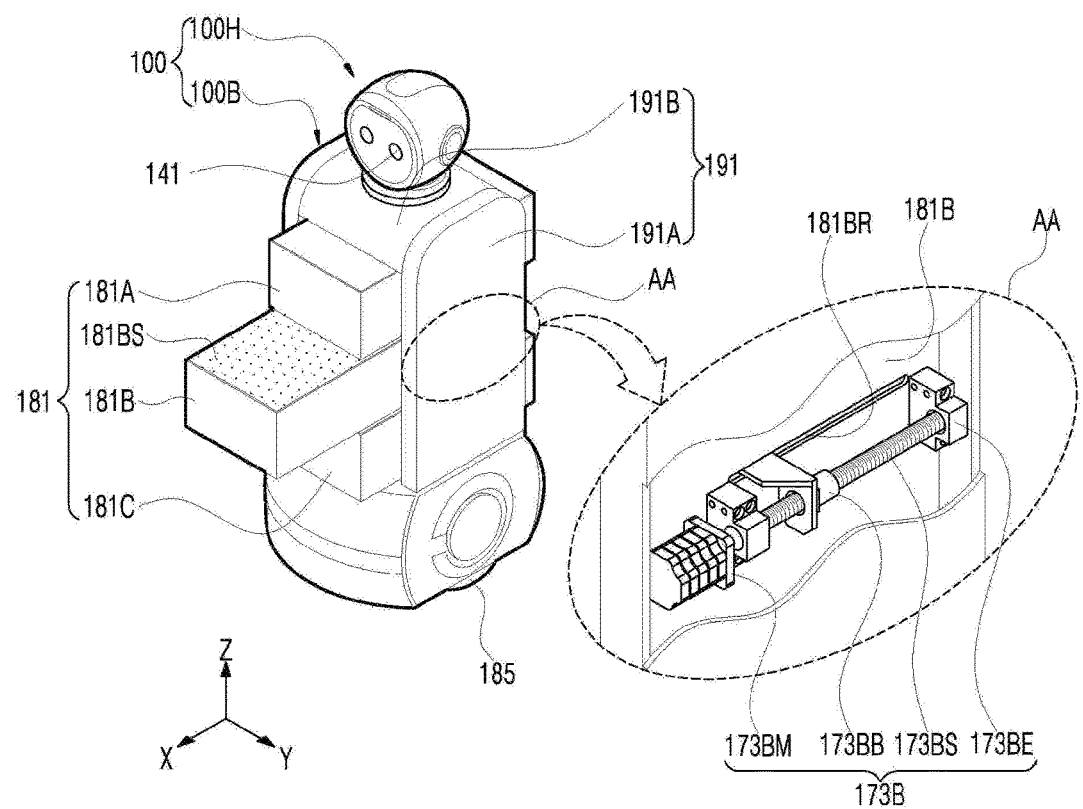
FIG. 4 illustrates a structure and operation of a mobile robot according to an embodiment of the present disclosure.

FIG. 4 illustrates a structure of the mobile robot 100 according to an embodiment of the present disclosure.

The mobile robot 100 may include the head 100H and the body 100B, and the head 100H may be provided with the display 141 to output various information, and may receive user manipulation (for example, button input and touch input).

The body 100B may include a plurality of storage boxes 181(181A to 181C) for storing articles, and various modules, circuits, and configurations required for driving the mobile robot 100. A region surrounding the modules, circuits, and configurations may be referred to as a drive housing (170D in FIG. 16, hereinafter described together with components described with reference to FIG. 4), and the drive housing 170D may be disposed below a lowermost storage box 181C, and may be coupled to a lowermost portion of the frame 191.

In addition, the body may include a plurality of wheels 185 to move to a destination.

The body 100B may include frames 191A and 191B (191) with open lower portions for fixing the plurality of storage boxes 181 such that that the plurality of storage boxes 181 form a layer in a vertical direction. A lower portion of the frame 191 and the drive housing 170D may be coupled to each other.

The frame 191 may include a plurality of vertical supports 191A and a horizontal support 191B connecting upper portions of the vertical supports 191A. The vertical supports 191A may be disposed to face each other with the plurality of storage boxes 181 interposed therebetween, and may be formed to surround at least a portion of a side surface of each of the plurality of storage boxes 181. The head 100H may be disposed on an upper portion of the horizontal support 191B. The head 100H may rotate based on a gravity axis, and in an alternative embodiment, the head 100H may rotate 360 degrees.

The vertical supports 191A may extend in a height direction from an upper portion of the drive housing 170D, and may include a linear driver (173 in FIG. 8) such that each of the plurality of storage boxes 181 slidingly moves in a horizontal direction (a front-rear or left-right direction). That is, the vertical supports 191A each may include a plurality of guides for sliding movement of the plurality of storage boxes.

All of the storage boxes 181 may slidingly move in a front or rear direction, and each of the storage boxes 181 may be moved by the linear driver. A linear driver 173B for moving the second storage box 181B will be described as an example.

The linear driver 173B may include a step motor 173BM, a shaft axis 173BS connected to the step motor 173BM to rotate by power of the step motor 173BM, a ball bush structure 173BB for moving the shaft axis 173BS, and a bearing 173BE. As the ball bush structure 173BB moves a rail 181BR of the second storage box 181B, the second storage box 181B may slidingly move in a front or rear direction.

Hereinafter, among a plurality of storage boxes, a storage box positioned at the top is referred to as a first storage box 181A, a storage box positioned in the middle is referred to as a second storage box 181B, and a storage box positioned at the bottom is a third storage box 181C. However, in an alternative or additional embodiment, the mobile robot 100 may include four or more storage boxes.

By providing the mobile robot 100 according to the present disclosure, a storage box may be effectively formed in a vertical direction and an article may be stored in the storage box, so that the mobile robot 100 may easily move in a narrow passage. In addition, the mobile robot 100 may have a cylindrical shape in a vertical direction and the storage box may slidingly move bidirectionally, thereby effectively performing space occupancy and enhancing user convenience.

Figure 5A:
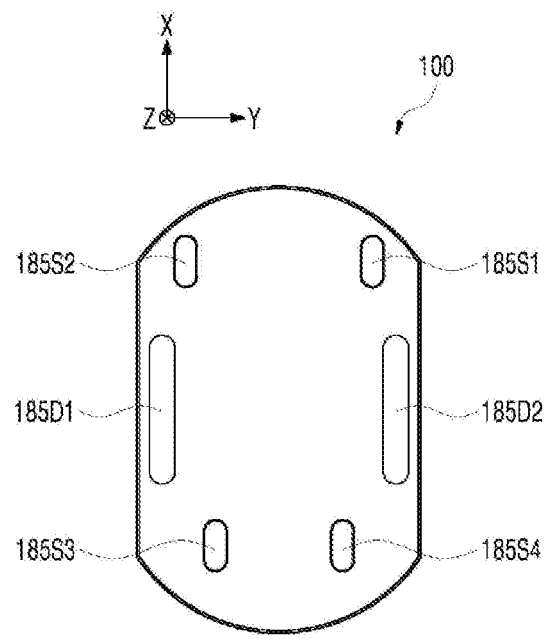
FIG. 5A is a bottom view of a mobile robot including a plurality of wheels according to an embodiment of the present disclosure.
Figure 5B:
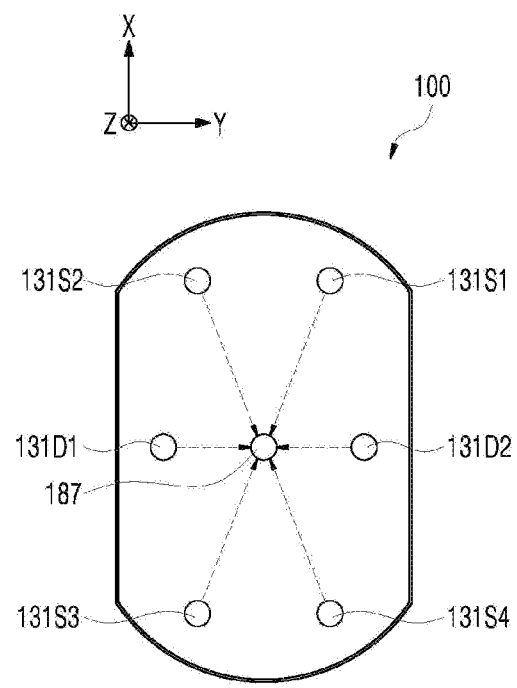
FIG. 5B illustrates determination of center-of-gravity information of a mobile robot based on information collected from pressure sensors disposed on a plurality of wheels.

FIG. 5A is a bottom view of the mobile robot 100 including the plurality of wheels 185 according to an embodiment of the present disclosure. FIG. 5B illustrates determination of center-of-gravity information of the mobile robot 100 based on information collected from pressure sensors disposed on a plurality of wheels.

Referring to FIG. 5A, the mobile robot 100 may include the plurality of wheels 185 (185S1 to S4 and 185D1 to D2), and the plurality of wheels 185S1 to S4 and 185D1 to D2 may include a plurality of driving wheels 185D1 to D2 and a plurality of rotating wheels 185S1 to S4. The plurality of driving wheels 185D1 to D2 may be driven by a wheel driver (171 in FIG. 8 to be described later). However, the number of driving wheels may vary depending on implementation. The plurality of rotating wheels 185S1 to S4 may be used to change directions, and in an alternative embodiment, the plurality of rotating wheels 185S1 to S4 may be implemented to be controlled by the wheel driver.

Referring to FIG. 5B, a plurality of pressure sensors 131 (131S1 to S4 and 131D1 to D2) may be respectively disposed on the plurality of wheels 185S1 to S4 and 185D1 to D2. The mobile robot 100 may determine center-of-gravity information 187 of the mobile robot 100 based on pressure information collected from the plurality of pressure sensors 131S1 to S4 and 131D1 to D2.

A controller 190 to be described later may measure pressure information of each of the plurality of wheels 185S1 to S4 and 185D1 to D2 through the pressure sensors 131 (131S1 to S4 and 131D1 to D2).

The controller 190 may determine the center-of-gravity information based on the pressure information of pressure applied to each of the wheels 185S1 to S4 and 185D1 to D2 from the pressure sensors 131 (131S1 to S4, and 131D1 to D2). The determination may be performed by measurement and/or estimation. The center-of-gravity information 187 may be displayed on an X-Y plane, and may be disposed on a Z axis as illustrated in FIG. 6 to be described later.

Figure 6:
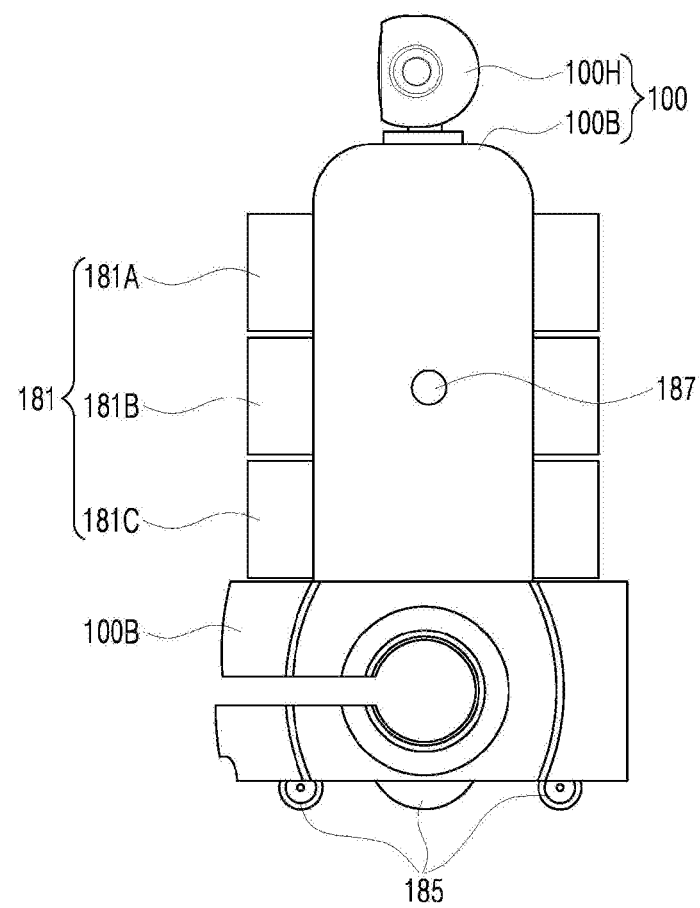
FIG. 6 illustrates center-of-gravity information of a mobile robot according to an embodiment of the present disclosure.

FIG. 6 illustrates center-of-gravity information of the mobile robot 100 according to an embodiment of the present disclosure.

Referring to FIG. 6, the mobile robot 100 may determine the center-of-gravity information 187 based on information collected from a first pressure sensor 131 disposed on each of the plurality of wheels 185 and a second pressure sensor (133 in FIG. 8) disposed on each of lower portions of the plurality of storage boxes 181.

The controller 190 to be described later may determine the center-of-gravity information 187, and the determination may be performed by measurement and/or estimation.

Figure 7:
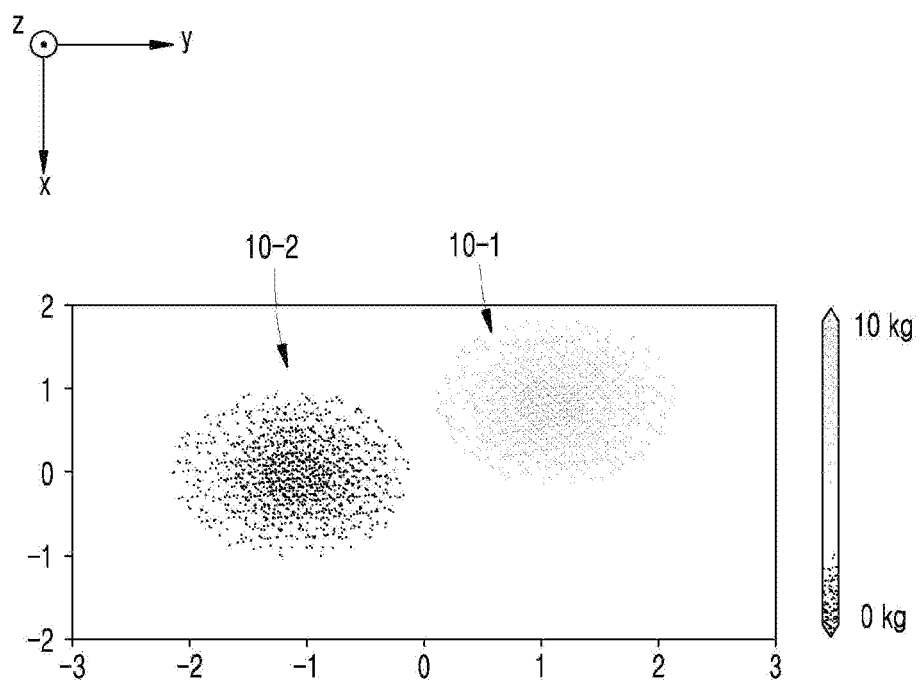
FIG. 7 illustrates weight distribution information of a storage box according to an embodiment of the present disclosure.

FIG. 7 illustrates measurement of weight distribution information of articles 20C and 20D on a predetermined storage box according to an embodiment of the present disclosure.

Referring to FIG. 7, a pressure sensor 133 may be disposed on each of the lower portions of the plurality of storage boxes 181, and may measure weight distribution information of articles 10-1 and 10-2 applying a load to the predetermined storage box.

The pressure sensor 133 may display a position on an X-Y plane, where a first article 10-1 may be disposed in a first quadrant, and a second article 10-2 may be disposed in a second/third quadrant. A weight measured by the pressure sensor 133 may be 0 to 10 kg, however such weight is merely one embodiment, and a larger weight may be measured depending on implementation. In FIG. 7, a method for displaying the measured articles 10-1 and 10-2 is merely one embodiment, and weights of articles may be measured and displayed in various ways. And A weight sensing range may be implemented differently according to the pressure sensor performance.

Figure 8:
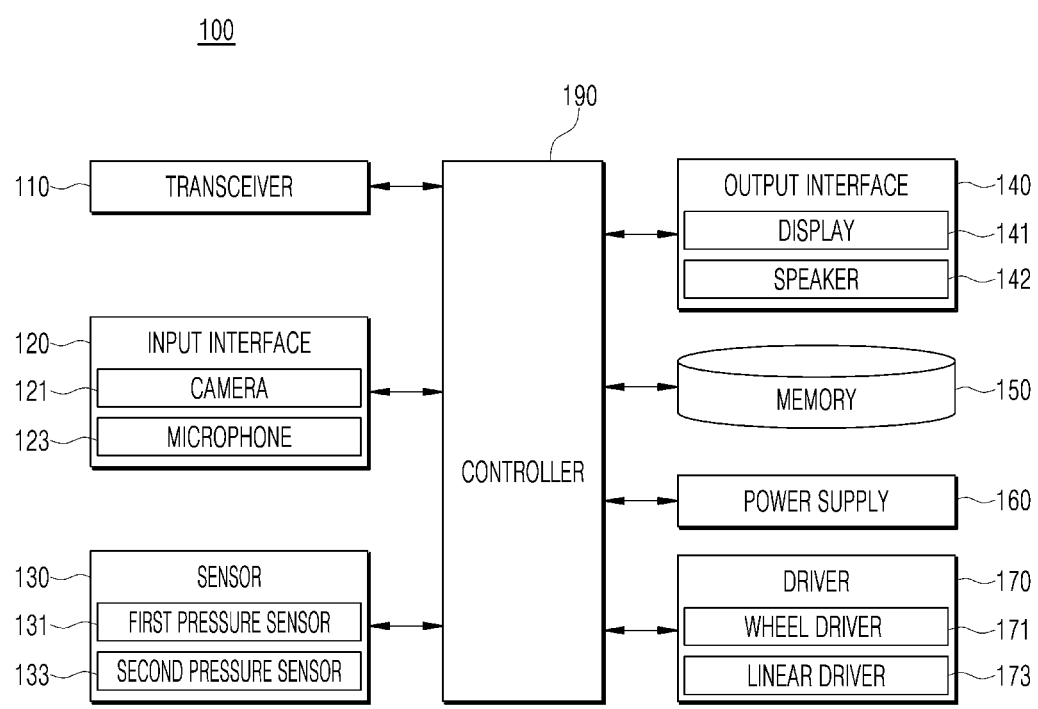
FIG. 8 is a block diagram illustrating a configuration of a mobile robot according to an embodiment of the present disclosure.

FIG. 8 is a block diagram illustrating a configuration of the mobile robot 100 according to an embodiment of the present disclosure.

The mobile robot 100 may include a transceiver 110, an input interface 120, a sensor 130, an output interface 140, a memory 150, a power supply 160, a driver 170, and the controller 190. The mobile robot 100 described herein may have more or less components than the above-described components.

The transceiver 110 may include a wired/wireless communication module capable of communicating with the control system 300 and the mobile terminal (200 in FIG. 1).

The input interface 120 may include a user input interface for receiving information from a user. In an alternative embodiment, the input interface 120 may include a camera 121 from which the input interface 120 receives an image signal and a microphone 123 (hereinafter referred to as "mic") from which the input interface 120 receives an audio signal. In this case, the signal obtained from the camera 121 or the microphone 123 may be referred to as sensing data or sensor information, by considering the camera 121 or the microphone 123 as a sensor. The camera 121 may have a vision recognition function to determine types of articles stored in the plurality of storage boxes 181. The camera 121 may be used to recognize an article client or an article recipient on a vision recognition basis. The input interface 120 may further include a module capable of being tagged.

The input interface 120 may obtain, for example, learning data for model learning and input data used when output is obtained using a learning model. The input interface 120 may obtain raw input data. In this case, the controller 190 may extract an input feature by preprocessing the input data.

The sensor 130 may obtain at least one of internal information of the transporting robot 100, surrounding environment information of the transporting robot 100, or user information by using various sensors.

Accordingly, the sensor 130 may include a satellite-based position receiving sensor, a distance sensor, an illumination sensor, an obstacle sensor, an acceleration sensor, a magnetic sensor, a gyro sensor (gyroscopic sensor) 135, the first pressure sensor 131, the second pressure sensor 132, an inertial sensor, an RGB sensor, an infrared (IR) sensor, a finger scan sensor, an ultrasonic sensor, an optical sensor, a microphone, a lidar sensor, a barometer sensor, and a radar.

Of the above-described sensors, the first pressure sensor 131 may be implemented in a plurality, and may be disposed on each of the plurality of wheels 185 of the mobile robot 100 to measure pressure information of pressure applied to each of the plurality of wheels 185.

The first pressure sensor 131 may include the acceleration sensor and the gyro sensor, and may be a multi-axis sensor. The first pressure sensor 131 may be implemented as a digital load cell. In response to a load being applied, the first pressure sensor 131 may convert a physical force into an electrical signal. To this end, the first pressure sensor 131 may include a strain gauge, a temperature sensor, various circuits (amplification and A/D conversion), and a serial communication interface.

The second pressure sensor 133 may be disposed on each of the lower portions of the plurality of storage boxes 181 to measure weight distribution information of each of the plurality of storage boxes 181, as illustrated in FIG. 7.

The controller 190 may determine the center-of-gravity information of the mobile robot 100 based on the information collected from a plurality of first pressure sensors 131 and a plurality of second pressure sensors 133.

The output interface 140 may generate a visual, auditory, or tactile related output and may include an optical output interface and the display 141 (a plurality of displays can be implemented) for outputting visual information, a speaker 143 for outputting auditory information, and a haptic module for outputting tactile information.

The memory 150 may store a plurality of application programs (or applications) to be driven by the mobile robot 100, data for operating the mobile robot 100, and commands.

In addition, the memory 150 may store information necessary to perform an operation by using artificial intelligence, machine learning, and ANN. The robot memory 150 may store a deep neural network model. The deep neural network model may be used to infer result values for new input data rather than training data. The inferred value may be used as the basis for the judgment to perform any operation.

The power supply 160 may be supplied with external power and internal power to supply the power to each component of the mobile robot 100, under the control of the controller 190. The power supply 160 may include a battery, and the battery may be an embedded battery or a replaceable battery. The battery may be charged via a wired or wireless charging method, and the wireless charging method may include a magnetic induction method or a magnetic resonance method.

A driver 170 may include a wheel driver 171 and a linear driver 173.

The wheel driver 171 may drive the plurality of wheels 185 to move the body 100B.

The linear driver 173 may slidingly move the storage boxes 181 such that the storage boxes 181 move in a front-back direction (and/or a left-right direction), and may be implemented in a plurality.

The controller 190 may monitor the center-of-gravity information of the mobile robot 100 in real time. Specifically, in response to the mobile robot 100 stopping, traveling, and loading or unloading an article, and a storage box is opening, the controller 190 may monitor the center-of-gravity information of the mobile robot 100.

The controller 190 may manage the center-of-gravity information of the mobile robot 100 so as not to deviate from a predetermined reference range. For example, in response to the mobile robot 100 stopping, traveling, and loading or unloading an article, and a storage box is opening, the controller 190 may slidingly move the storage box such that a variation in the determined center-of-gravity information does not exceed a predetermined mm. A range that does not exceed the predetermined mm may be set as a reference range, but the range may vary depending on implementation.

In addition, in response to the center-of-gravity information being outside the predetermined reference range, the controller 190 may output a warning message on the display 141. In response to there being a risk of the mobile robot 100 being overturned due to a variation in the center-of-gravity information, the controller 190 may display in advance a corresponding warning phrase and a direction in which the mobile robot 100 is to be overturned, thereby preventing an accident.

In response to the center-of-gravity information being beyond the reference range, the controller 190 may control the linear driver 173 so as to slidingly move at least some of the plurality of storage boxes 181 such that the center-of-gravity information is set to be within the reference range.

The controller 190 may provide, based on characteristic information including weight information of an article to be stored and arrangement information of articles stored in the plurality of storage boxes 181, storage box information of the plurality of boxes in which the article is to be stored and arrangement information of articles in a storage box to a user, through the display 141.

The controller 190 may photograph an article recipient through the camera 121, recognize the article recipient from a photographed image, and determine whether the recognized article recipient has a right to receive an article based on pre-stored information. When recognizing the article recipient, the controller 190 may identify the article recipient by using a pre-stored neural network-based recognition model.

Figure 9:
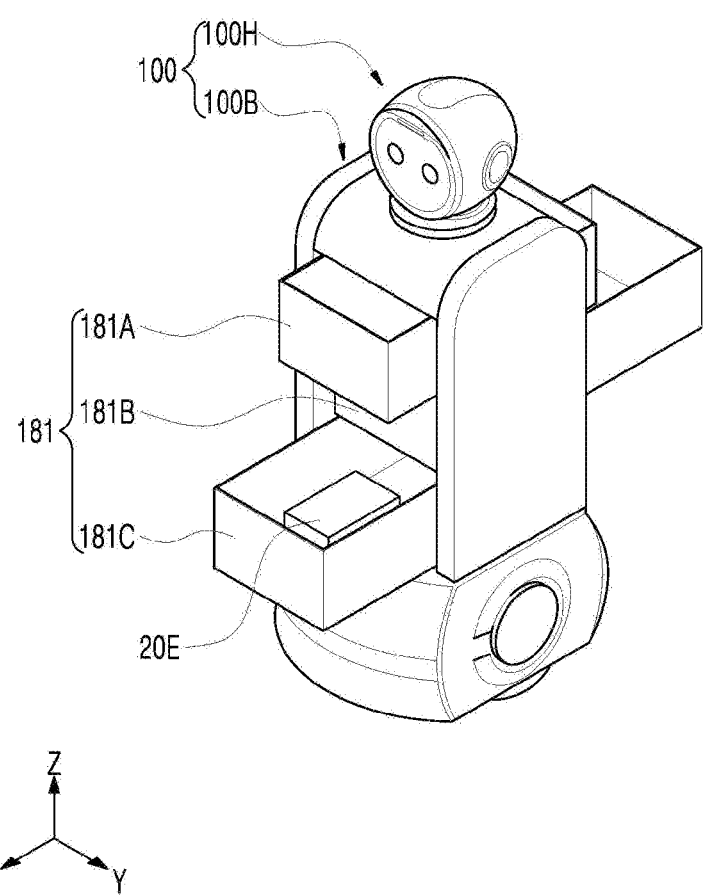
FIGS. 9 and 10 illustrate operation of a mobile robot that slidingly moves a storage box by setting movement directions differently according to various embodiments of the present disclosure.
Figure 10:
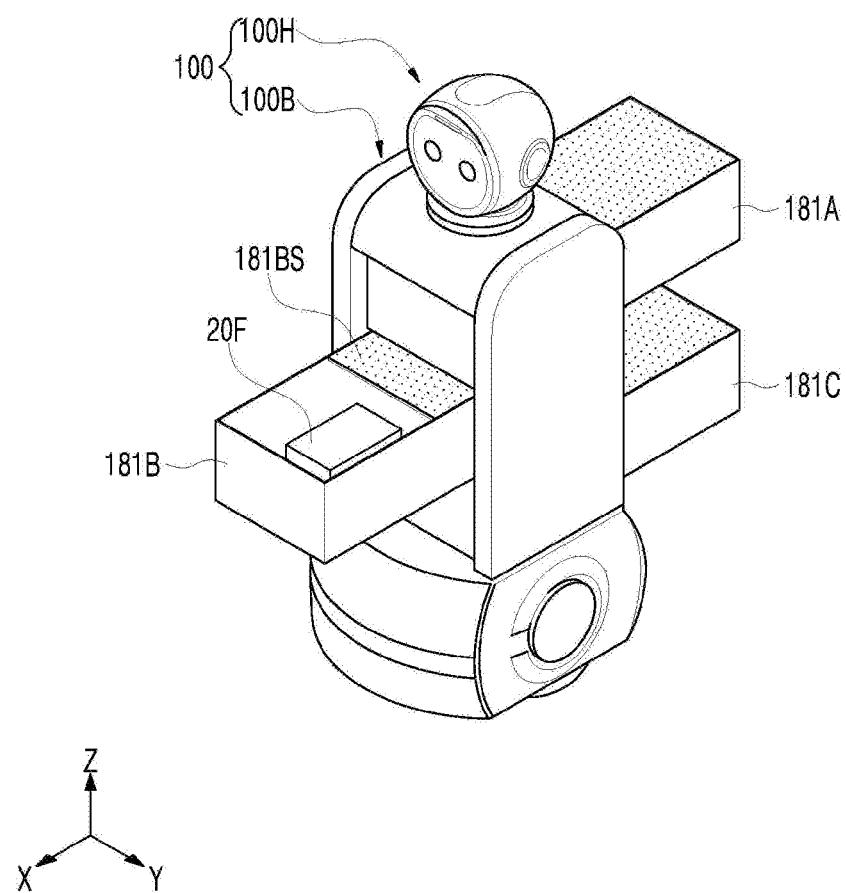

FIGS. 9 and 10 illustrate operation of a mobile robot that slidingly moves the plurality of storage boxes 181 by setting movement directions differently according to various embodiments of the present disclosure.

Referring to FIG. 9, in response to the lowermost first storage box 181C slidingly moving in a front direction, the controller 190 may cause, based on a variation in the center-of-gravity information, the linear driver 173 to slidingly move the second storage box 181B in a rear direction.

Through the second storage box 181B moving in a rear direction, a weight balance may be adjusted, and at the same time the user may easily take out the article 20D stored in the first storage box 181C. That is, based on the second storage box 181B directly adjacent to the first storage box 181C moving, the convenience of the user taking out the article 20D may be enhanced.

Before the first storage box 181C is slidingly moved, the controller 190 may determine in advance the second storage box 181B to be slidingly moved to correspond to the first storage box 181C.

The controller 190 may determine the storage box 181B to move in response to the movement of the first storage box 181C so as to swiftly balance the weight and improve device efficiency.

In response to the first storage box 181C slidingly moving, the controller 190 may monitor the center-of-gravity information in real time, and slidingly move the predetermined second storage box 181B corresponding to the first storage box 181C based on the center-of-gravity information determined in real time until a weight balance is made.

When it is difficult to balance the weight by only moving the second storage box 181B, the controller 190 may slidingly move the third storage box 181A additionally. In an alternative embodiment, when there are four or more storage boxes, the number of storage boxes to be additionally moved may vary depending on the number of storage boxes.

Referring to FIG. 10, when the second storage box 181B is a closed-type storage box, the controller 190 may move the first storage box 181C and the third storage box 181A in a rear direction so as to balance the weight while slidingly moving the second storage box 181B in a front direction.

Accordingly, the controller 190 may move the third storage box 181A positioned on an upper portion of the second storage box 181B in an opposite direction, and may slidingly move a cover 181BS of the second storage box 181B at the same time in a movement direction of the third storage box 181A. To this end, the controller 190 may control a cover driver (not illustrated), thereby further enhancing user convenience.

The plurality of storage boxes 181 of the mobile robot 100 may be vertically formed, and may effectively move in a front-rear direction. Thus, it is possible to load or unload an article with minimal opening and closing, thereby more effectively protecting the safety of a user.

Figure 11:
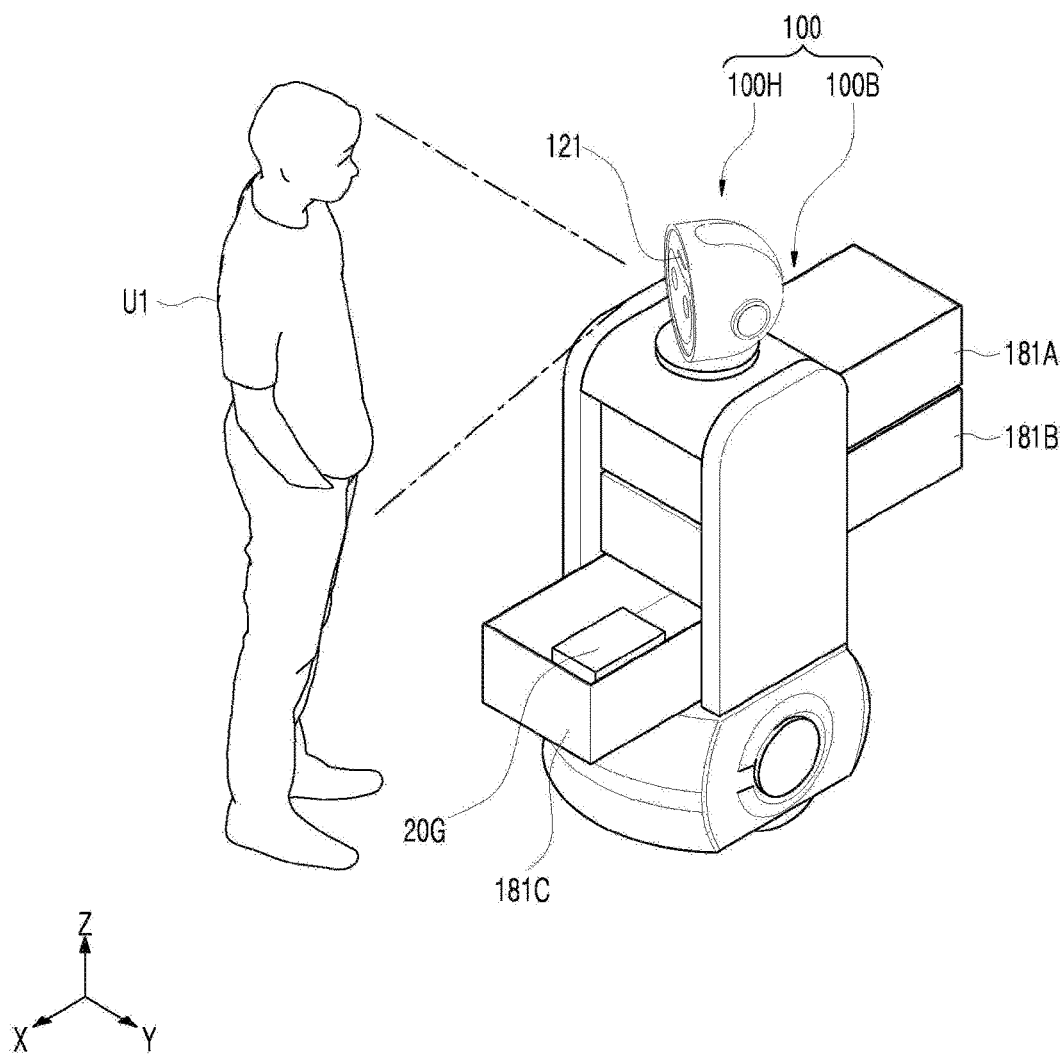
FIGS. 11 and 12 illustrate operation of a mobile robot that opens a storage box in accordance with an arrangement of an article recipient according to various embodiments of the present disclosure.
Figure 12:
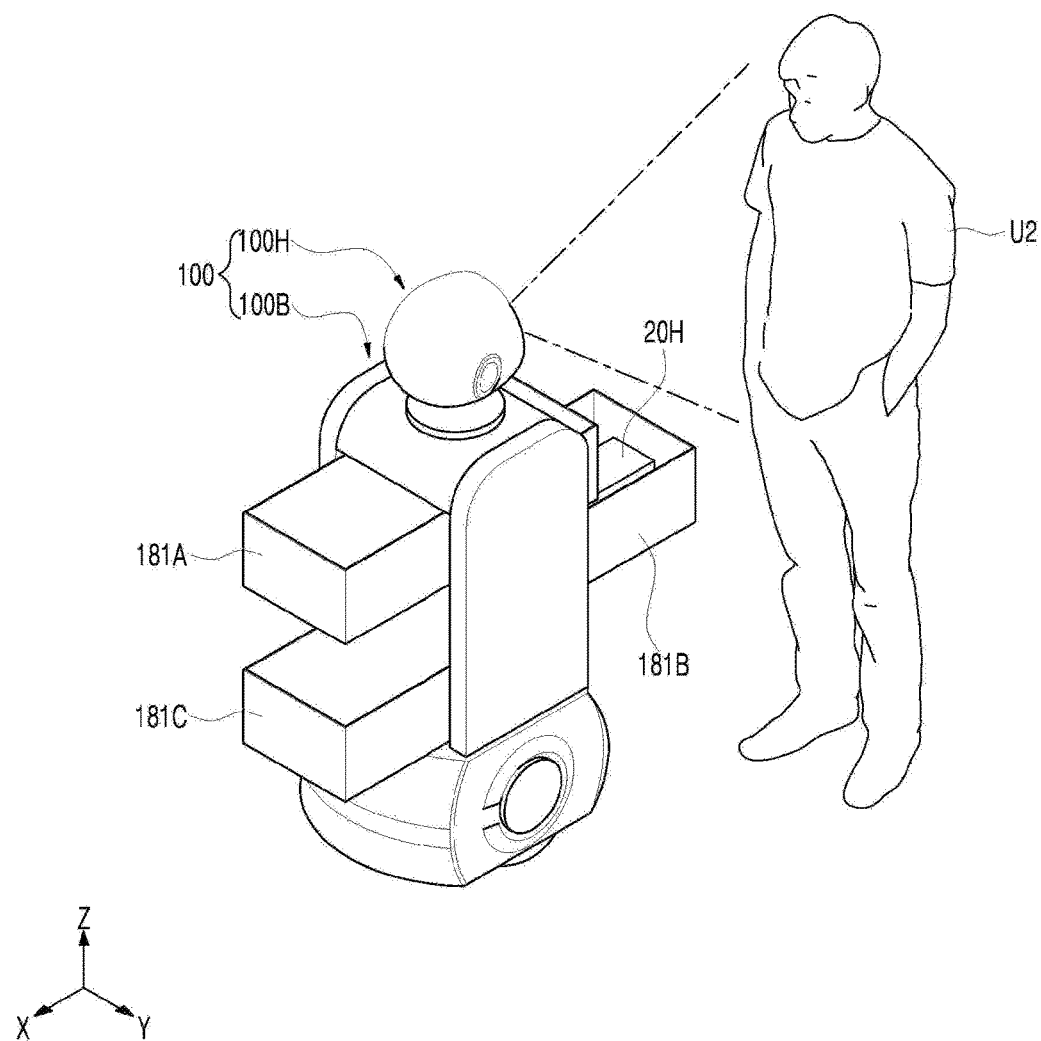

FIGS. 11 and 12 illustrate operation of the mobile robot 100 that opens a storage box in accordance with an arrangement of an article recipient according to various embodiments of the present disclosure.

The mobile robot 100 may be implemented to load or unload an article in a front or rear direction.

The mobile robot 100 may expose, based on recipients U1 and U2 arranged in a front direction U1 or a rear direction U2, the first storage box 181C (FIG. 11) and the second storage box 181B (FIG. 12) in a direction in which the recipients U1 and U2 are arranged.

Accordingly, the mobile robot 100 may recognize the recipients U1 and U2 by using the camera 121 disposed on the head 100H, and may open each of the storage boxes 181C and 181B in which articles 20G and 20H corresponding to the recipients U1 and U2 are stored. After recognizing the recipients U1 and U2, the mobile robot 100 may rotate in place or while travelling to provide the recipients U1 and U2 with the articles 20G and 20H corresponding to the recipients U1 and U2.

In addition, even when storing an article in a storage box, the mobile robot 100 may open the storage box based on a position of an article loader. Moreover, the mobile robot 100 may monitor current center-of-gravity information to open the storage box such that the center-of-gravity information of the mobile robot 100 does not deviate from a reference range, and may guide loading the article with regard to at which point in the storage box to load the article through the display 141. The mobile robot 100 may monitor the center-of-gravity information whenever the article is loaded or unloaded, and may open the storage box based on the center-of-gravity information.

Figure 13:
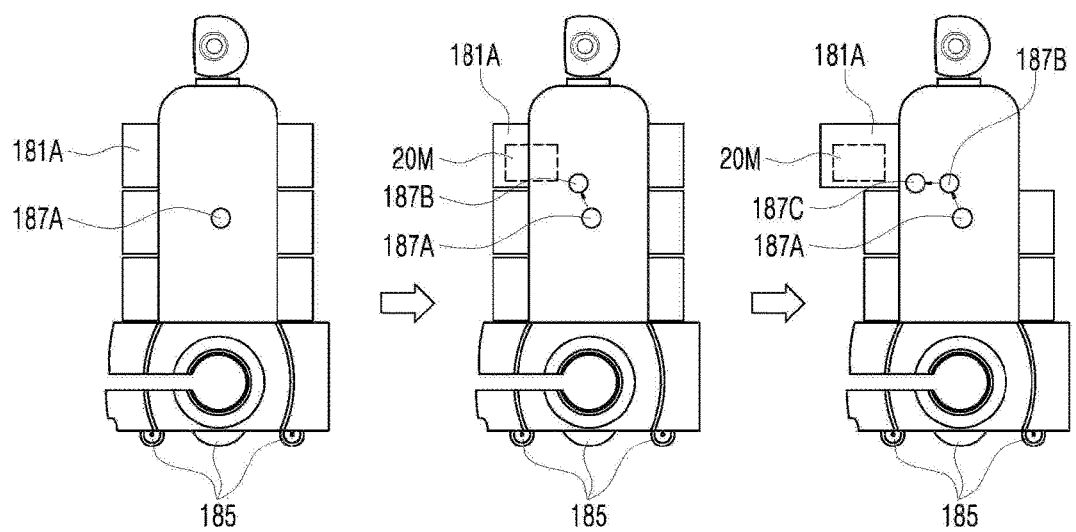
FIG. 13 illustrates a variation in center-of-gravity information of a mobile robot according to an embodiment of the present disclosure.

FIG. 13 illustrates a variation in center-of-gravity information of the mobile robot 100 according to an embodiment of the present disclosure.

The controller 190 may determine center-of-gravity information 187A when a first article is not in the plurality of storage boxes 181, update center-of-gravity information 187B after an article 20M is loaded, and update center-of-gravity information 187C when the first storage box 181A is opened.

In addition, in response to a weight of an article to be stored in a storage box exceeding a predetermined range, the controller 190 may perform guidance to load the article in the lowermost storage box 181C.

Figure 14:
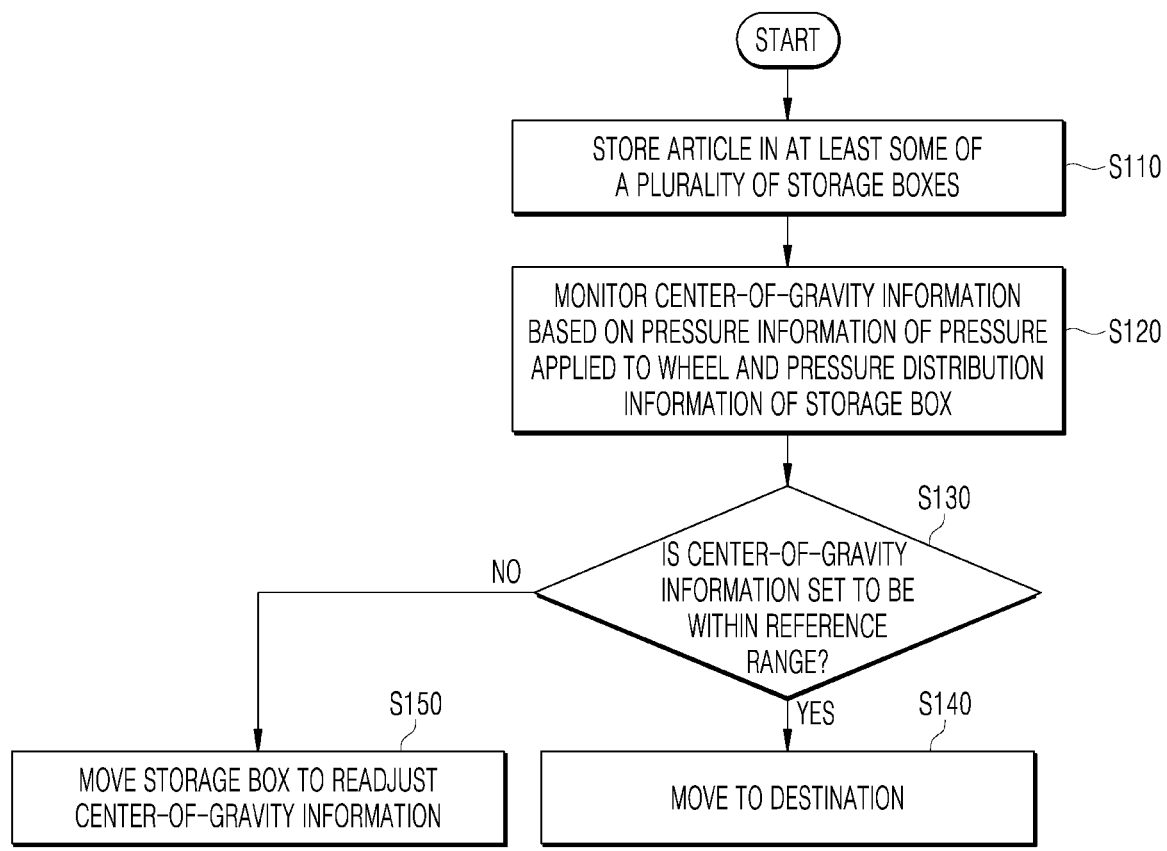
FIG. 14 is a sequence diagram illustrating a method for operating a mobile robot according to an embodiment of the present disclosure.

FIG. 14 is a sequence diagram illustrating a method for operating the mobile robot 100 according to an embodiment of the present disclosure.

The mobile robot 100 may store an article in at least some of a plurality of storage boxes (S110).

The mobile robot 100 may perform guidance to store an article having a weight exceeding a predetermined range in a lowermost storage box.

Thereafter, the mobile robot 100 may monitor center-of-gravity information based on pressure information of pressure applied to a plurality of wheels and pressure distribution information of the plurality of storage boxes (S120).

Thereafter, in response to the center-of-gravity information being set to be within a reference range (S130), the mobile robot 100 may move to the destination (S140).

In response to the center-of-gravity information of the mobile robot 100 being beyond the reference range, a storage box may be moved to readjust the center-of-gravity information (S150).

The moving the storage box (S150) may include slidingly moving a second storage box in an opposite direction of the one front or rear direction, based on a variation in the center-of-gravity information resulting from a first storage box slidingly moving in one front or rear direction.

In addition, the method for operating the mobile robot may further include determining in advance the second storage box to be slidingly moved to correspond to the first storage box, before the first storage box is slidingly moved.

The slidingly moving the second storage box may include, in response to the first storage box being slidingly moved, monitoring the center-of-gravity information in real time, and slidingly moving the second storage box such that the center-of-gravity information monitored in real time is set to be within the reference range.

Figure 15:
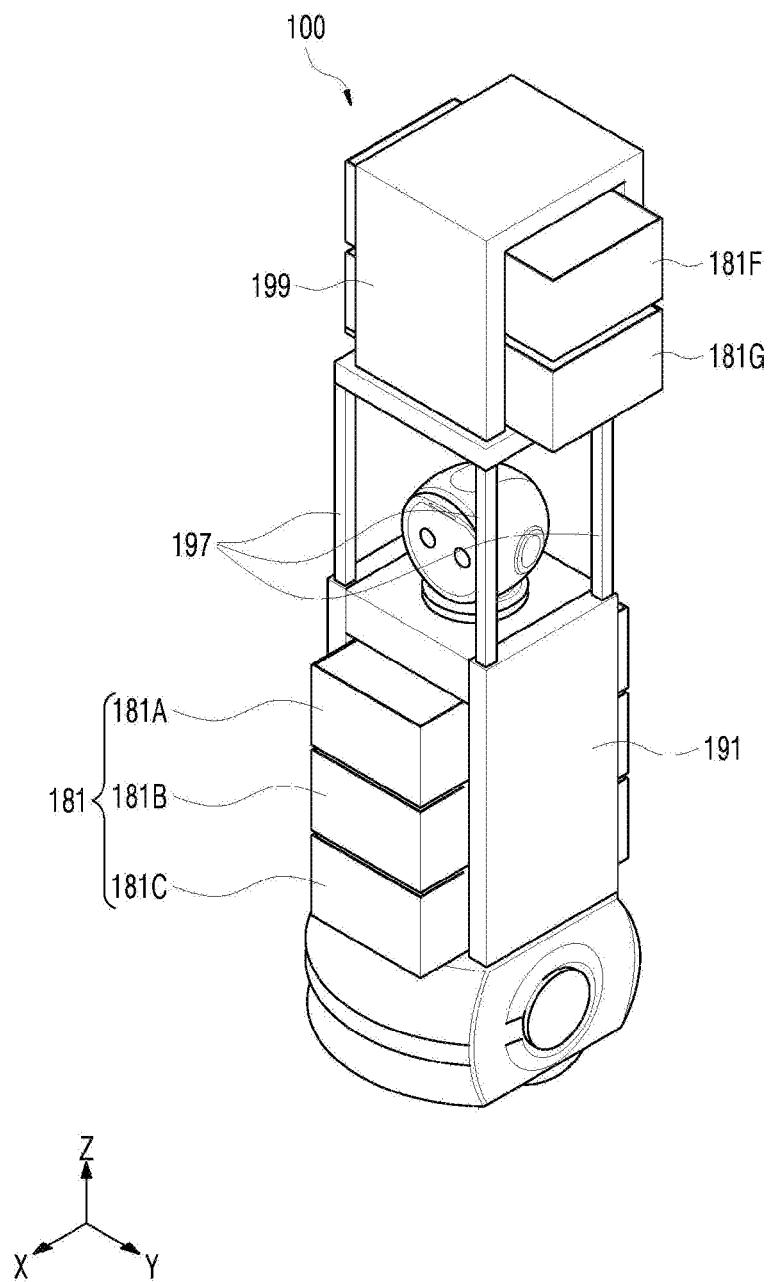
FIG. 15 illustrates a structure of a mobile robot according to an embodiment of the present disclosure.

FIG. 15 illustrates a structure of the mobile robot 100 according to an embodiment of the present disclosure.

The mobile robot 100 may further include a plurality of additional storage boxes 181F and 181G. The additional storage boxes 181F and 181G may slidingly move in a front-rear direction in which the existing storage boxes 181 are opened and with a 90-degree phase. Accordingly, the mobile robot 100 may balance the weight in all of front-rear and left-right (or east-west and north-south) directions.

To this end, the mobile robot 100 may include expansion frames 197 and 199 on an upper portion of the existing frame 191. The expansion frames 197 and 199 may be disposed on a horizontal support of the frame 191, and may fix the plurality of additional storage boxes 181F and 181G such that the plurality of additional storage boxes 181F and 181G form a layer in a vertical direction.

Accordingly, the linear driver 173 may slidingly move the additional storage boxes 181F and 181G as well as the existing storage boxes 181 under the control of the controller 190.

When center-of-gravity information is beyond a reference range, the controller 190 may control the linear driver 173 so as to slidingly move at least some of the plurality of storage boxes 181 and the plurality of additional storage boxes 181F and 181G such that the center-of-gravity information is set to be within the reference range.

Figure 16:
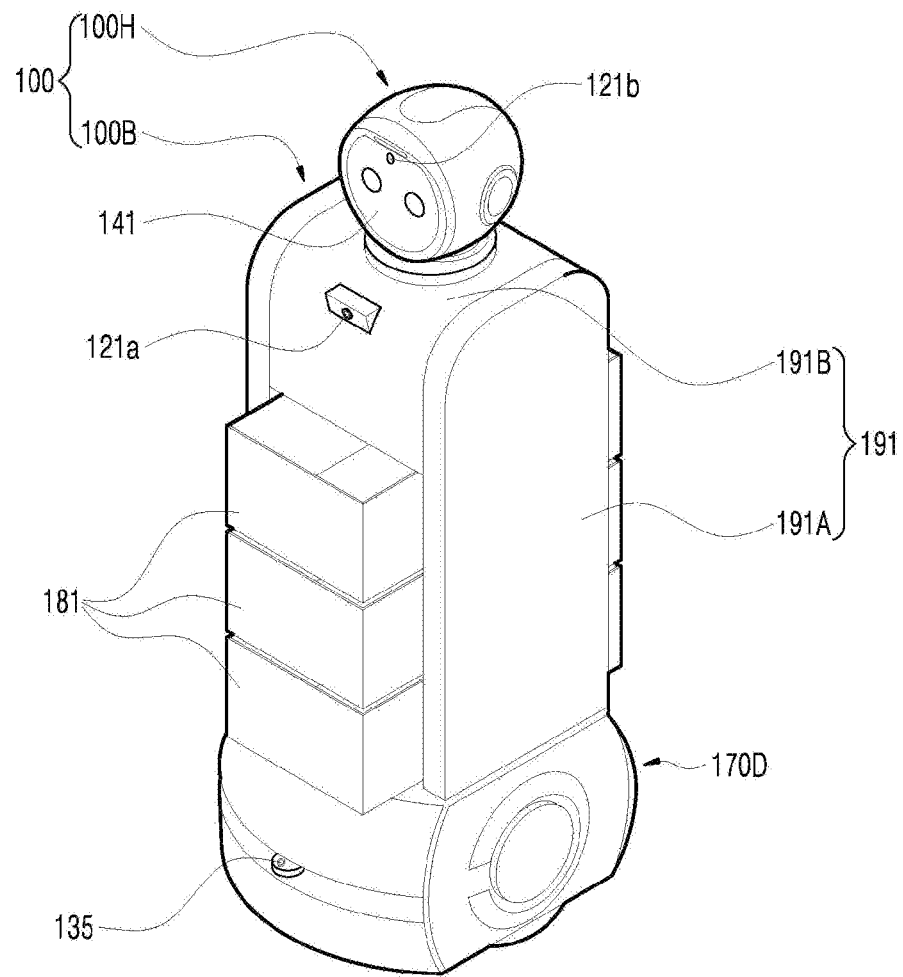
FIG. 16 illustrates a structure of a mobile robot according to an embodiment of the present disclosure.

FIG. 16 illustrates a structure of the mobile robot 100 according to an embodiment of the present disclosure.

Referring to FIG. 16, the mobile robot 100 may include the plurality of storage boxes 181, and the drive housing 170D disposed below the plurality of storage boxes 181 and in which a module for driving the mobile robot 100 is positioned. The drive housing 170D may be applied to all mobile robots in the above-described figures.

The mobile robot 100 may include a plurality of vertical supports 191A extending in a height direction from an upper portion of the drive housing 170D, disposed to face each other with the plurality of storage boxes 181 interposed therebetween, and including a plurality of guides for slidingly moving the plurality of storage boxes 181.

The mobile robot 100 may include a horizontal support 191B connecting the plurality of vertical supports 191A, and while a vertical thickness of the horizontal support 191B may be formed to a thickness as illustrated in FIG. 16, a photographing angle of a first sensor 121a (which may be implemented as an RGB or RGB+depth camera) disposed in a predetermined region of the horizontal support 191B may not be limited by the storage boxes 181.

The first sensor 121a may be disposed in the region to widen a sensing range, and may be fixed more appropriately than being disposed on the rotating display 141 and as such minimizes the occurrence of an error. When the first sensor 121a is disposed on the display 141, an error may occur according to the rotation and tilting of the head 100H. In addition, the mobile robot 100 may determine a type of obstacle (whether the obstacle is a person or an object) by using the first sensor 121a.

In addition, the mobile robot 100 may include a second sensor 135 (which may be implemented as a lidar sensor) disposed in a predetermined recessed region of the drive housing 170D. The second sensor 135 may sense an obstacle or an object at the front of the mobile robot 100. The mobile robot 100 may determine whether there is a cliff or a risk factor under the mobile robot 100 by using the second sensor 135.

The mobile robot 100 may include a third sensor 121b (which may be implemented as an RGB or RGB+depth camera) in the head 100H. By using the third sensor 121b, the mobile robot 100 may photograph a surrounding image, and may understand gesture and intention of a user when performing interaction with the user.

The present disclosure described above may be embodied as computer-readable codes on a medium on which a program is recorded. The computer-readable medium may include all kinds of recording devices in which computer-readable data is stored. The computer readable medium may be, for example, a hard disk drive (HDD), a solid state disk (SSD), a silicon disk drive (SDD), read only memory (ROM), random access memory (RAM), CD-ROM, a magnetic tape, a floppy disk, or an optical data storage device. In addition, the computer may include the processor 190 of the mobile robot 100.

While the specific exemplary embodiments of the present disclosure have been described above and illustrated, it will be understood by those skilled in the art that the present disclosure is not limited to the described exemplary embodiments, and various modifications and alterations may be made without departing from the spirit and the scope of the present disclosure. Therefore, the scope of the present disclosure is not limited to the above-described exemplary embodiments, but shall be defined by the technical thought as recited in the following claims.

What is claimed is:

1. A mobile robot comprising:
a body;
a wheel driver configured to move the body by using a plurality of wheels; and
a controller,
wherein the body comprises:
a plurality of storage boxes;
a frame configured to fix the plurality of storage boxes such that the plurality of storage boxes form a layer in a vertical direction; and
a linear driver configured to slidingly move each of the plurality of storage boxes in a front or rear direction, and
wherein the controller monitors center-of-gravity information of the mobile robot, and based on the center-of-gravity information being beyond a reference range, slidingly moves at least some of the plurality of storage boxes through the linear driver such that the center-of-gravity information is set to be within the reference range.

2. The mobile robot of claim 1,
further comprising a head coupled to an upper portion of the body, and
wherein the frame comprises:
a plurality of vertical supports disposed to face each other with the plurality of storage boxes interposed between the plurality of vertical supports, the plurality of vertical supports being formed to surround at least a portion of a side surface of each of the plurality of storage boxes; and
a horizontal support configured to connect upper portions of the plurality of vertical supports to each other,
wherein the head is disposed on an upper portion of the horizontal support to be rotatable about a gravity axis.

3. The mobile robot of claim 2, further comprising:
a plurality of additional storage boxes; and
an expansion frame disposed on the horizontal support of the frame and configured to fix the plurality of additional storage boxes such that the plurality of additional storage boxes form a layer in a vertical direction,
and wherein the linear driver slidingly moves the plurality of additional storage boxes in a left or right direction having a 90-degree phase with respect to the front or rear direction, and
wherein, based on the center-of-gravity information being beyond a reference range, the controller controls the linear driver to slidingly move some of the plurality of storage boxes and the plurality of additional storage boxes such that the center-of-gravity information is set to be within the reference range.

4. The mobile robot of claim 1, wherein the plurality of storage boxes comprises a drawer-type storage box with an open upper portion or a closed-type storage box,
wherein the closed-type storage box comprises a cover and a cover driver configured to slidingly move the cover.

5. The mobile robot of claim 4, further comprising:
a plurality of first pressure sensors disposed to respectively correspond to the plurality of wheels and configured to respectively measure pressure information of pressure applied to the plurality of wheels; and
a plurality of second pressure sensors disposed on a lower portion of each of the plurality of storage boxes to measure pressure distribution information of each of the plurality of storage boxes,
wherein the controller is configured to determine center-of-gravity information of the mobile robot based on information collected from the plurality of first pressure sensors and the plurality of second pressure sensors.

6. The mobile robot of claim 5, wherein the controller is configured to cause, based on a variation in center-of-gravity information resulting from a first storage box slidingly moving in one of a front or rear direction, the linear driver to slidingly move a second storage box in a direction opposite to the one of the front or rear direction.

7. The mobile robot of claim 6, wherein the second storage box comprises a storage box directly adjacent to an upper portion of the first storage box.

8. The mobile robot of claim 7, wherein the controller is configured to control a cover driver of the first storage box such that a cover of the first storage box moves in a direction in which the second storage box slidingly moves, when the first storage box is a closed-type storage box.

9. The mobile robot of claim 6, wherein the controller is configured to determine in advance the second storage box to be slidingly moved to correspond to the first storage box, before the first storage box is slidingly moved.

10. The mobile robot of claim 9, wherein the controller is configured to:
monitor center-of-gravity information of the mobile robot in real time in response to the first storage box being slidingly moved; and
slidingly move the second storage box to be slidingly moved to correspond to the first storage box such that the center-of-gravity information is set to be within the reference range.

11. The mobile robot of claim 10, wherein the controller is configured to cause the linear driver to slidingly move at least one third storage box in response to difficulty in setting the center-of-gravity information to be within the reference range due to sliding movement of the first storage box and the second storage box.

12. The mobile robot of claim 1, wherein the mobile robot is configured to be capable of storing an article in each of the plurality of storage boxes or withdrawing articles stored in the plurality of storage boxes in both front and rear directions in which the plurality of storage boxes slidingly move.

13. The mobile robot of claim 12, wherein the controller controls the linear driver such that a storage box slidingly moves in a direction that is easy for a user to access.

14. The mobile robot of claim 1,
wherein the head further comprises a display, and
wherein the controller provides, based on arrangement information of articles stored in the plurality of storage boxes and characteristic information comprising weight information of an article to be stored, storage box information of a storage box in which the article is to be stored and arrangement information of articles in a storage box, through the display.

15. The mobile robot of claim 14,
wherein the head comprises a vision recognition-based camera, and
wherein the controller photographs an article recipient through the camera, recognizes the article recipient in a photographed image, and determines whether the recognized article recipient is authorized to receive an article based on pre-stored information.

16. The mobile robot of claim 1, wherein the linear driver comprises a step motor, a shaft axis connected to the step motor to rotate by power of the step motor, and a ball bush structure for linear movement of each of the plurality of storage boxes on a rail installed on each of the plurality of storage boxes.

17. A method for operating a mobile robot, the method comprising:
   storing an article in at least some of a plurality of storage boxes;
   monitoring center-of-gravity information based on pressure information of pressure applied to a plurality of wheels for moving the mobile robot and pressure distribution information of the plurality of storage boxes; and
   in response to the center-of-gravity information being beyond a reference range, slidingly moving at least some of the plurality of storage boxes such that the center-of-gravity information is set to be within the reference range.

18. The method of claim 17, wherein the slidingly moving the at least some of the plurality of storage boxes comprises, based on a variation in center-of-gravity information resulting from a first storage box slidingly moving in one of a front or rear direction, slidingly moving a second storage box in a direction opposite to the one of the front or rear direction.

19. A mobile robot comprising:
   a plurality of storage boxes configured to store an article;
   a drive housing disposed below the plurality of storage boxes and in which a wheel driver for driving the mobile robot is positioned;
   a plurality of vertical supports extending in a height direction from an upper portion of the driving housing, disposed to face each other with the plurality of storage boxes interposed between the plurality of vertical supports, and including a plurality of guides for slidingly moving the plurality of storage boxes;
   a horizontal support configured to connect the plurality of vertical supports in a horizontal direction;
   a head positioned on an upper portion of the horizontal support;
   a first sensor disposed in a predetermined region of the horizontal support and configured to monitor a front side of the mobile robot
   a second sensor disposed in the drive housing and configured to sense an external object; and
   a processor configured to monitor center-of-gravity information of the mobile robot, and based on the center-of-gravity information being beyond a reference range, slidingly moving at least one of the plurality of storage boxes using a linear driver such that the center-of-gravity information is set to be within the reference range.

* * * * *